July 19, 1966    M. C. ENGMAN ETAL    3,261,579
UNIVERSAL MUFFLER AND TAIL PIPE HOLDING BRACKET
Filed Sept. 21, 1964      3 Sheets-Sheet 1
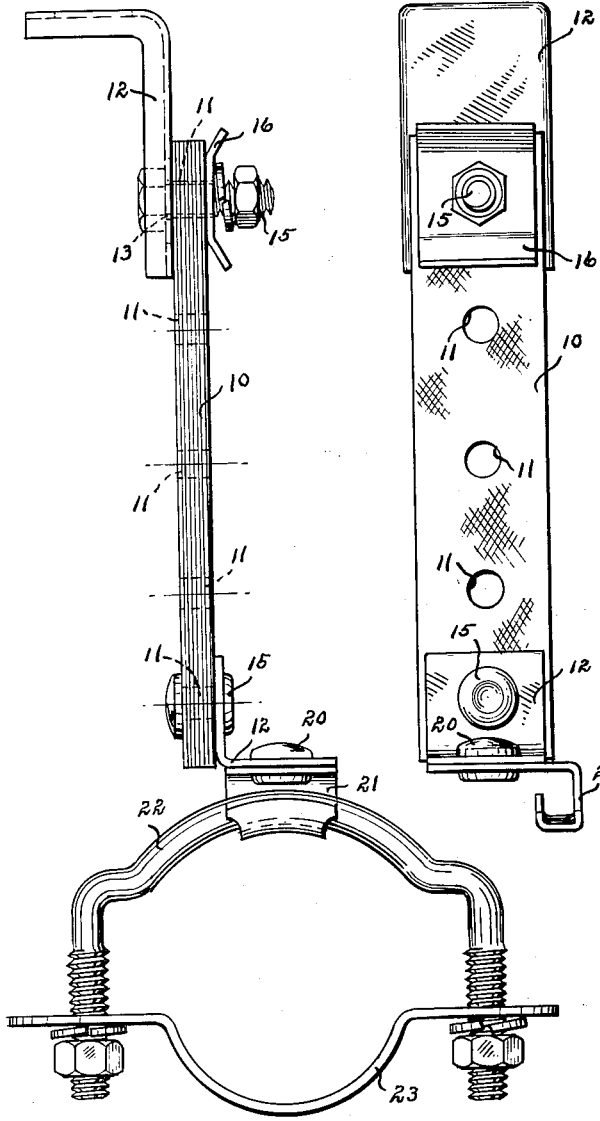
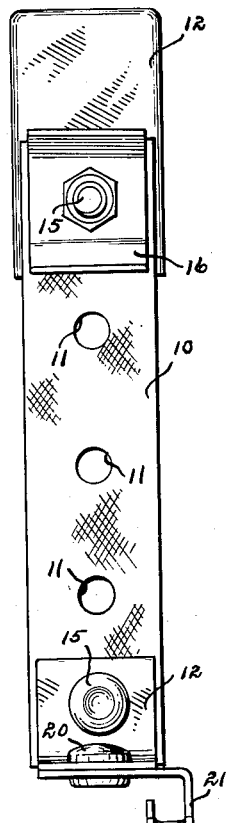
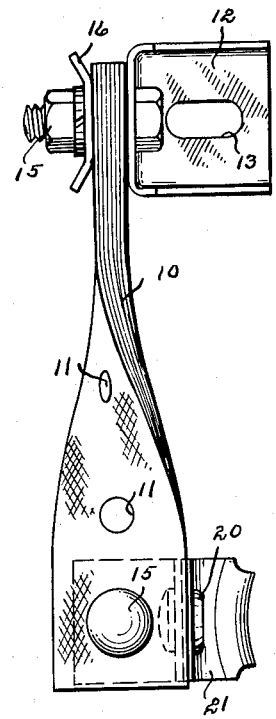
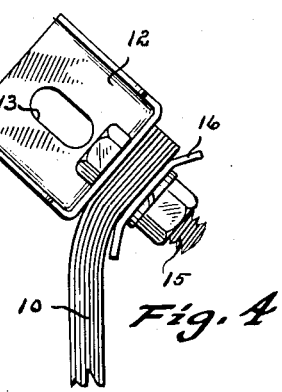
INVENTORS.
MILTON C. ENGMAN
AVERY VAN ZEE
BY
Dick & Zarley
ATTORNEYS July 19, 1966  M. C. ENGMAN ETAL  3,261,579
UNIVERSAL MUFFLER AND TAIL PIPE HOLDING BRACKET
Filed Sept. 21, 1964  3 Sheets-Sheet 2
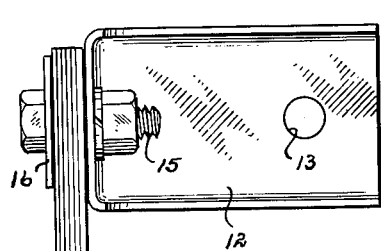
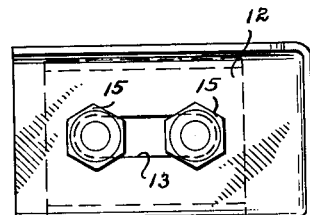
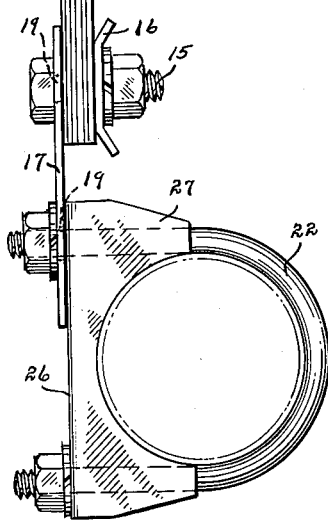
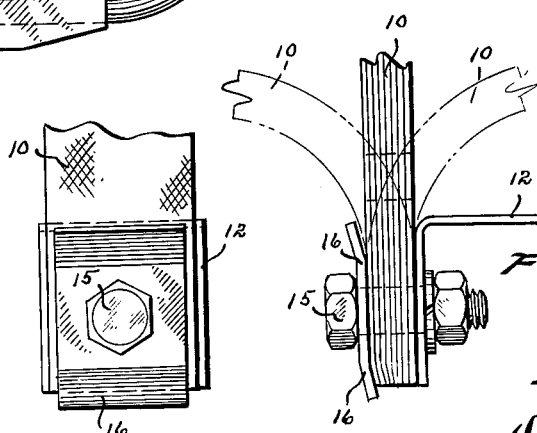
INVENTORS.
MILTON C. ENGMAN
AVERY VAN ZEE
BY
Dick & Harley
ATTORNEYS July 19, 1966   M. C. ENGMAN ETAL   3,261,579
UNIVERSAL MUFFLER AND TAIL PIPE HOLDING BRACKET
Filed Sept. 21, 1964   3 Sheets-Sheet 3

INVENTORS.
MILTON C. ENGMAN
AVERY VAN ZEE
BY
Dick and Zarley
ATTORNEYS

United States Patent Office

3,261,579
Patented July 19, 1966

1

3,261,579
UNIVERSAL MUFFLER AND TAIL PIPE
HOLDING BRACKET
Milton C. Engman and Avery Van Zee, Des Moines, Iowa,
assignors to Engman Manufacturing Company, Des
Moines, Iowa, a corporation of Iowa
Filed Sept. 21, 1964, Ser. No. 397,912
2 Claims. (Cl. 248—60)

This invention relates to bracket means and more particularly to universal holding brackets for supporting the muffler and tail pipe of automotive vehicles having an internal combustion engine as the motive power.

Automotive vehicles such as automobiles and trucks support the engine muffler and exhaust pipe by means of brackets secured to the vehicle chassis. Inasmuch as these supporting brackets are below the seating compartment of the vehicle and open to the elements they rapidly deteriorate and rust out. Replacement of these parts is most difficult because, each year the vehicle manufacturers change models, and a given bracket that would fit this year's vehicle would not necessarily fit next year's model, even if the same brand. Thus, it is almost impossible for a repair service establishment to carry in stock, all the types of brackets to meet the replacement demand.

Therefore one of the principal objects of our invention is to provide a universal multiple choice bracket assembly that will successfully fit most models of automobiles and trucks regardless of year of manufacture.

A further object of this invention is to provide a universal muffler and tail pipe bracket holding means that is easily assembled and/or adjusted to meet installation requirements.

A still further object of this invention is to provide a bracket of many choice adjustments, thereby the service establishment need only carry in stock a minimum of units to meet his requirements.

A still further object of this invention is to provide a universal holding bracket that may be adjusted and/or assembled for successfully supporting the muffler and all associated parts of the muffler.

Still further objects of our invention are to provide a universal muffler and tail pipe holding bracket that is economical in manufacture and durable in use.

These are other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings, in which:

FIG. 1 is a side view illustrating one from of the assembled parts;

FIG. 2 is a front view of the assembled form shown in FIG. 1 with the U-bolt clamp removed;

FIG. 3 is a side elevation of the hanger bar strap illustrating its twist flexibility to fit certain installations;

FIG. 4 is a side view of the upper portion of the bar strap illustrating its capability to be bent to fit certain installations;

FIG. 5 is a side view showing a different assembly of parts and a saddle clamp means suspended from the strap means;

FIG. 6 is a front view of the assembly shown in FIG. 5;

FIG. 7 is a lower portion of a flexible bar strap having an L-shaped member at its lower end for attaching purposes;

FIG. 8 is a side view of the parts shown in FIG. 7 and also illustrates the flexing of the strap;

2

Figures 10, 11:
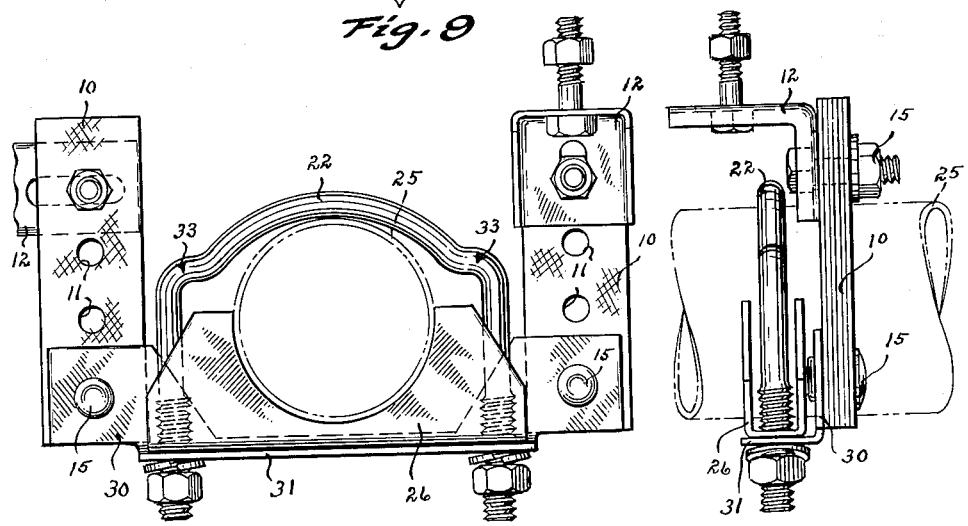

FIG. 10 is a front view of the assembled parts; and
FIG. 11 is a side view.

As herebefore indicated our hanger bracket comes in kit packaging and the various parts are assembled to meet specific requirements.

The numeral 10 designates th elongated laminated flexible strap bar, preferably made of fabric and rubber-like material or like. This strap 10 may be relatively narrow as shown in FIG. 2, or relatively wide as shown in FIG. 6. If desired two of these straps side by side may be used to meet a given installation. The strap has a plurality of spaced apart holes 11, at least one row of which is vertical. The numeral 12 generally designates the upper rigid metallic part fixture and which is of an L-shaped plate structure. These members 12 may be of any suitable size, i.e., may be relatively large as shown in FIG. 5, or relatively small. Each end portion has one or more either holes or slots 13. One end portion of the member 12 may be longer than the other end portion. Either end may have a bolt or rivet means 15 passed through it and a selected hole 11 of the strap 10. By this structure, the member 12 may be rotated, or lowered or raised in the strap 10 to fit a specific installation. After the proper adjustment has been obtained, a bolt or like is passed through the free end portion of the member 12 and the chassis or part of the vehicle to which the muffler or muffler tail pipe is to be suspended. If it is desired that the member 12 not rotate on the strap 10, two bolts or like may be extended through the strap and the member 12 as shown in FIG. 6. A backing plate 16 may be used on the side of the strap 10 opposite from the strap side having the L-shaped member 12, and with the holding bolt or like means passing through it as shown in FIG. 1 and FIG. 5. If the situation requires it, an L-shaped member 12 and backing plate 16 may be installed on the lower end of the strap 10, as shown in FIG. 8. Also if the need exists a linkage plate 17 may be employed such as shown in FIG. 5. This linkage plate 17 has holes 19 to receive bolt, rivet or like means for its attachment. In many installations, not only will an L-shaped member 12 be secured to at the upper area of the strap 10, but an L-shaped member 12 will also be secured to the lower area of the strap 10 by rivet or bolt means 15. Secured to the lower L-shaped member 12 or to a linkage plate 12, by a bolt or rivet means 20, is a hook member 21. By this arrangement of parts the hook member 21 may be rotated on its supporting member. This hook member 21 has one end bent first downwardly then horizontally and then upwardly as shown in FIG. 2 to form a hook for detachably engaging a U-bolt 22. As shown in FIGS. 1 and 2, the resulting U-shaped supporting portion of hook member 21 is arcuate in shape and is complementary to the arcuate shape of the arcuate upper portion of the U-bolt 22. The shape of the U-shaped portion of the lower part of hook member 21, as best in FIG. 2, will prevent the inadvertent horizontal sliding removal of the U-bolt 22 from the hook 21, and permits the weight of the resulting pipe within the bolt 22 to help prevent the U-bolt 22 and the hook 21 from becoming detached through vibration. The U-bolt shown in FIG. 1, has a conventional keeper bar 23, and this bar and U-bolt are adapted to clamp around the muffler or muffler connecting pipes 25. In FIG. 5, we have this keeper bar in the form of a finned saddle, having a flat base portion 26 and parallel fins 27 and 29 extending from its two side edges, respectively. The two end portions of the U-bolt detachably extend through the flat base portion 26 and the fin portions 27 and 29 extend rearwardly at the two sides of each of the two end portions of the U-bolt, prior to their passage through the base 26, as shown in FIG. 2. The rear center length areas of the two fins are cut away to provide an arcular concave area for the reception of one side of the pipe or like 25. If desired the U-bolt assembly including the saddle keeper bar may be secured to the hook member 21, secured directly to the lower end portion of the bar strap 10, or be secured to the linkage 17 as shown in FIG. 5. All parts of the assembly, except the bar strap and possibly spring washers, are of rigid materials such as metal or like. If two bar straps are used they may be secured together by the linkage plates 17.

Figure 9:
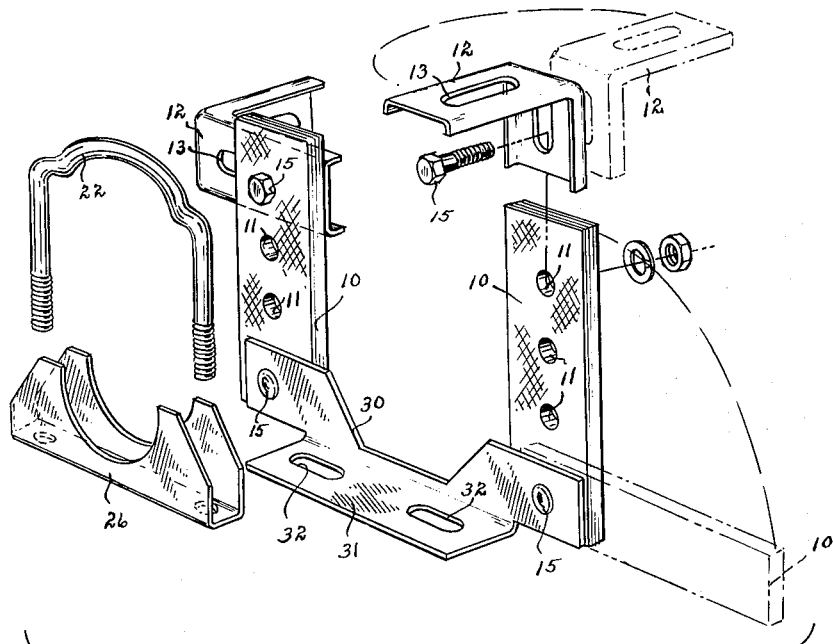
FIG. 9 is an exploded view of a composite assembly.

In FIG. 9 two of the strap bars 10 are used. If desired they may be secured together by the connecting plate 30. Regardless of the connecting means, the rivet or bolt means 15 thereof should be rotatable so that either strap may be laterally swung relative to the other. The connecting plate 30 should have a hook ledge portion 31 to which is secured the holding clamp means. This hook ledge portion may be placed either in top or bottom arrangement merely by rotating the straps 10. Usually a U-bolt clamp means will be secured to the hook ledge portion 31. The ledge has slot openings 32 in order to fit different sizes of U-bolts. The U-bolt 22 is constructed to fit various diameter pipes or like in that it has a central arcular portion, then its end portions are each bent outwardly at 33, and then bent forwardly as shown in FIG. 1 and FIG. 9. In some installations, the L-shaped members 12 will be dispensed with at the top of the strap 10, and a bolt 15 selectively passed through one of the holes 11, and the supporting frame of the vehicle. Due to the flexibility of the strap bar 10 and its rotatable securement to the various rigid parts, it serves as an excellent adjustable hanger supporting means. The U-bolt 22 may be used either with the keeper member 23 or the keeper member 26. In most installations, if the member 12 has one slot hole in one end, and one round hole in the other, the bolt 15 will be passed through the round hole.

From the foregoing, it will be seen that we have provided a kit of assemblable parts and which may be suitably assembled to successfully take care of most all requirements of supporting the engine exhaust pipe, the muffler and the exhaust tail pipe.

Some changes may be made in the construction and arrangement of our universal muffler and tail pipe holding bracket without departing from the real spirit and purpose of our invention, and it is our intention to cover by our claims, any modified forms of structure or use of mechanical equivalents which may be reasonably included within their scope.

We claim:
1. In a tailpipe holding bracket,
first and second spaced apart elongated flexible bar strips,
a normally horizontal elongated connecting member,
a horizontal ledge portion on said horizontal connecting member and having two spaced apart openings therein,
a U-shaped clamp member having opposite ends of a U-shaped portion extending through said openings; tightening means on the ends of said U-shaped portion that extends through the openings in said flange,
pivotal securing means pivotally connecting one end of each of said bar strips adjacent to opposite ends, rerepectively, of said connecting member to permit said bar strips to pivot in the same vertical plane,
said pivotal securing means being positioned away from said horizontal ledge portion so that the relative distance between said ledge portion and the adjacent ends of said bar strips is changed as said bar strips are rotated from a first position at substantial right angles to said connecting member through an arc of substantially 180 degrees to a second position at substantially right angles to said connecting member.

2. In a tailpipe holding bracket,
a single resilient and flexible bar strip,
a rigid member rotatably secured to the upper portion of said bar strip and adapted to be secured to a support means,
an L-shaped rigid member comprising two perpendicularly disposed flanges with the first of said flanges being pivotally secured on one side of said bar strip, with the second of said flanges extending transversely outwardly from said bar strip and said first flange,
and a rigid hook member rotatably secured to said second flange of said L-shaped rigid member and being adapted to receive a tailpipe clamp means, the pivotal axis of hook member on said second flange being at substantial right angles to the pivotal axis of said L-shaped rigid member on said bar strip,
said rigid hook member being comprised of an arcuate supporting portion which is U-shaped in cross-section;
and a normally vertically disposed inverted U-shaped clamp means having an arcuate portion complementary in arcuate shape to and detachably resting on the arcuate supporting portion of said rigid hook member, the shape of said U-shaped arcuate supporting portion preventing the inadvertent horizontal sliding removal of said clamp means therefrom.

References Cited by the Examiner

UNITED STATES PATENTS

| | | | |
|---|---|---|---|
| 791,504 | 6/1905 | Rosenfeld | 248—62 |
| 1,132,999 | 3/1915 | Beers | 248—59 X |
| 1,188,013 | 6/1916 | Putman | 248—221 X |
| 1,262,763 | 4/1918 | Farley | 248—62 |
| 2,339,565 | 1/1944 | Goldberg et al. | 248—62 |
| 2,392,932 | 1/1946 | Macbeth | 248—230 X |
| 2,705,158 | 3/1955 | Risley | 285—14 |
| 2,744,706 | 5/1956 | Gerdy | 248—60 |
| 2,981,351 | 4/1961 | Knickerbocker et al. | 180—64 |
| 3,161,252 | 12/1964 | Brown | 180—64 |

FOREIGN PATENTS 1,270,497   7/1961   France.

CLAUDE A. LE ROY, *Primary Examiner*.